(12) United States Patent
Watson et al.

(10) Patent No.: US 7,925,571 B2
(45) Date of Patent: Apr. 12, 2011

(54) SYSTEM AND METHOD FOR INTERACTING WITH A PLURALITY OF CONTENT RECEIVERS

(75) Inventors: John Xavier Watson, Coral Gables, FL (US); Kerstin Elsholz, Lowenstein (DE)

(73) Assignee: HSN Interactive LLC, St. Petersburg, FL (US)

( * ) Notice: Subject to any disclaimer, the term of this patent is extended or adjusted under 35 U.S.C. 154(b) by 298 days.

(21) Appl. No.: 11/995,923

(22) PCT Filed: Jan. 25, 2007

(86) PCT No.: PCT/US2007/001998
§ 371 (c)(1),
(2), (4) Date: Jul. 28, 2008

(87) PCT Pub. No.: WO2008/008094
PCT Pub. Date: Jan. 17, 2008

(65) Prior Publication Data
US 2008/0288367 A1  Nov. 20, 2008

(51) Int. Cl.
*G06Q 40/00* (2006.01)
(52) U.S. Cl. ....................................................... 705/37
(58) Field of Classification Search ............... 705/35–37
See application file for complete search history.

(56) References Cited

U.S. PATENT DOCUMENTS

| 7,006,987 B1 * | 2/2006 | Xie et al. ...................... 705/26.3 |
| 7,249,085 B1 * | 7/2007 | Kinney et al. ..................... 705/37 |
| 7,346,574 B2 * | 3/2008 | Smith et al. ...................... 705/37 |
| 7,409,360 B1 * | 8/2008 | Lark et al. .................... 705/26.3 |
| 7,562,034 B2 * | 7/2009 | Asher et al. .................. 705/26.3 |
| 2001/0027433 A1 * | 10/2001 | Fujiwara et al. ................ 705/37 |
| 2001/0037278 A1 * | 11/2001 | Messmer et al. ................ 705/37 |
| 2001/0051910 A1 | 12/2001 | Snelgrove et al. |
| 2002/0143692 A1 * | 10/2002 | Heimermann et al. ......... 705/37 |
| 2003/0041010 A1 | 2/2003 | Yonao-Cowen |
| 2003/0236739 A1 * | 12/2003 | Borgeson et al. ............... 705/37 |
| 2005/0080707 A1 * | 4/2005 | Glasspool ....................... 705/37 |
| 2005/0125331 A1 | 6/2005 | Dinwoodie |
| 2007/0124229 A1 * | 5/2007 | Ku et al. ......................... 705/37 |
| 2007/0136493 A1 * | 6/2007 | Linner ......................... 709/248 |

FOREIGN PATENT DOCUMENTS

WO   WO 2005/001728   1/2005

OTHER PUBLICATIONS

John Gentille. "Reverse Auctions Set Low-Bid Traps". Air Conditioning, Heating & Refrigeration News. Troy: Aug. 23, 2004. vol. 222, Iss. 17; p. 28, 2 pgs.*
"The great rock and roll auction ; Put in lowest unique bid and get tickets for Live8, Oasis, U2 orColdplay"; Sunday Mail. Glasgow (UK): Jun. 19, 2005. p. 6.*
Stefan Stern; "Mission to keep the costs down The Defence Ministry is on the front line in using 'reverse bidding' to save money", The Daily Telegraph. London (UK): Dec. 9, 2004. p. 03.*

* cited by examiner

*Primary Examiner* — Hani Kazimi
(74) *Attorney, Agent, or Firm* — Stephen M. De Klerk; SNR Denton US LLP (57) ABSTRACT

A system and method are described that allow TV viewers to play a game wherein a bidder submitting a lowest unique bid wins an auction article or its cash equivalent.

12 Claims, 9 Drawing Sheets

| CALLER IDENTIFICATION NUMBER | REGISTRATION NAME | PERSONAL IDENTIFICATION NUMBER |
|---|---|---|
| 308 572 8217 | ANGELA | 15214 |
| ⋮ ⋮ ⋮ | ⋮ | ⋮ |
| 410 387 2154 | JOHNP | 83152 |
| 510 321 6185 | ANGELA_2 | 21516 |
| ⋮ ⋮ ⋮ | ⋮ | ⋮ |
| 212 827 1254 | PETER_101 | 55255 |
| 415 629 8395 | guest_2596 | 83832 |

FIG. 1

| CALLER IDENTIFICATION NUMBER | REGISTRATION NAME | PERSONAL IDENTIFICATION NUMBER |
|---|---|---|
| 308 572 8217 | ANGELA | 15214 |
| ⋮ | ⋮ | ⋮ |
| 410 387 2154 | JOHNP | 83152 |
| 510 321 6185 | ANGELA_2 | 21516 |
| ⋮ | ⋮ | ⋮ |
| 212 827 1254 | PETER_101 | 55255 |

| REGISTERED NAME | BID | LEADER SEQUENCE |
|---|---|---|
| ANGELA_2 | £0.96 | 1 |
| guest_2596 | £0.50 | 2 |
| JOHNP | £0.56 | - 3 |
| PETER_101 | £0.50 | - |
| guest_652 | £0.52 | 4 6 |
| guest_2596 | £0.50 | - |
| guest_727 | £0.56 | - |
| JOHNP | £0.52 | - |
| ANGELA | £0.96 | - |

FIG. 6

| CALLER IDENTIFICATION NUMBER | REGISTRATION NAME | PERSONAL IDENTIFICATION NUMBER |
|---|---|---|
| 308 572 8217<br>⋮ ⋮ ⋮<br>410 387 2154<br>510 321 6185<br>⋮ ⋮ ⋮<br>212 827 1254<br>415 629 8395 | ANGELA<br>⋮<br>JOHNP<br>ANGELA_2<br>⋮<br>PETER_101<br>guest_2596 | 15214<br>⋮<br>83152<br>21516<br>⋮<br>55255<br>83832 |

SYSTEM AND METHOD FOR INTERACTING WITH A PLURALITY OF CONTENT RECEIVERS

CROSS-REFERENCE TO OTHER APPLICATIONS

This is a National Phase of International Application No. PCT/US2007/001998, filed on Jan. 25, 2007, which claims priority from Great Britain Provisional Patent Application No. 0602121.6, filed on Feb. 2, 2006.

BACKGROUND OF THE INVENTION

This invention relates generally to a system and method for interacting with a plurality of content receivers, and more specifically to a system and method that allow television (TV) viewers to submit bids in a competition, wherein a viewer submitting a lowest unique bid is a winner of an auction article or its cash equivalent.

SUMMARY OF THE INVENTION

The invention provides a system for interacting with a plurality of content receivers, comprising a transmission system for transmitting information about an auction article to a plurality of remote locations to be received by a plurality of content receivers at the respective remote locations, and transmitting an invitation to enter a lowest unique bid for the auction article to the content receivers at the respective remote locations, a receiving system to receive a plurality of bid amounts for the auction article from a subset of the plurality of content receivers, a computer memory, a computer processor, a storing module in the computer memory, which is executable by the processor to store the bid amounts and information of the subset of the plurality of content receivers who submitted the bid amounts in the computer memory, an evaluation module in the computer memory, which is executable by the computer processor to determine a lowest unique bid among the bid amounts stored in the computer memory, and an extraction module in the computer memory, which is executable by the processor to extract information of a winning content receiver who submitted the lowest unique bid from the memory.

The information about the auction article may include an image signal of the auction article so that an image of the auction article is viewable on screens at the respective remote locations.

The system may further comprise a camera system positionable to record a live image of the auction article and convert the live image to the image signal that is transmitted by the transmission system.

The receiving system may be a telephone receiving system.

The telephone receiving system, computer processor, storing module, evaluation computer module, and extracting module may form part of an interactive voice recognition system.

The telephone receiving system may receive a bid amount when a content receiver enters the bid amount on a key pad of a telephone.

The evaluation computer module may determine whether a bid is unique, and determine whether the bid is the lowest bid after determining whether the bid is unique.

The system may further comprise a bid termination system for ending an auction.

The evaluation computer module may determine a lowest unique bid after the auction is ended.

The evaluation computer module may determine a lowest unique bid before the auction is ended.

The system may further comprise a graphics broadcasting system that provides text identifying the bidder with the lowest unique bid to the transmission system, the transmission system transmitting a signal of the text to be viewed on screens at the remote locations.

The system may further comprise a fallback module in the computer memory, that executes in the computer processor if the evaluation module determines that there is no unique bid, the fallback module (i) determining which bid amounts have the lowest number of bids, (ii) determining which bid amount determined in (i) is the lowest, and determining which bid determined in (ii) was first submitted, the extracting module extracting information of a winning content receiver who submitted the bid determined (iii).

The invention also provides a method of interacting with a plurality of content receivers, comprising transmitting information about an auction article to a plurality of remote locations to be received by the content receivers located at the respective remote locations, transmitting an invitation to enter a lowest unique bid for the auction article to the content receivers at the respective remote locations, receiving a plurality of bid amounts for the auction article from a subset of the plurality of the content receivers, storing the bid amounts and information of the subset of the plurality of content receivers who submitted the bid amounts in memory of a computer, executing an evaluation computer module in a processor of a computer that determines a lowest unique bid among the bid amounts stored in the memory, extracting the information of a winning content receiver who submitted the lowest unique bid from the memory, and notifying the winning content receiver of submitting the lowest unique bid.

BRIEF DESCRIPTION OF THE DRAWINGS

The invention is further described by way of example with reference to the accompanying drawings, wherein.

DETAILED DESCRIPTION OF THE INVENTION

Figure 1:
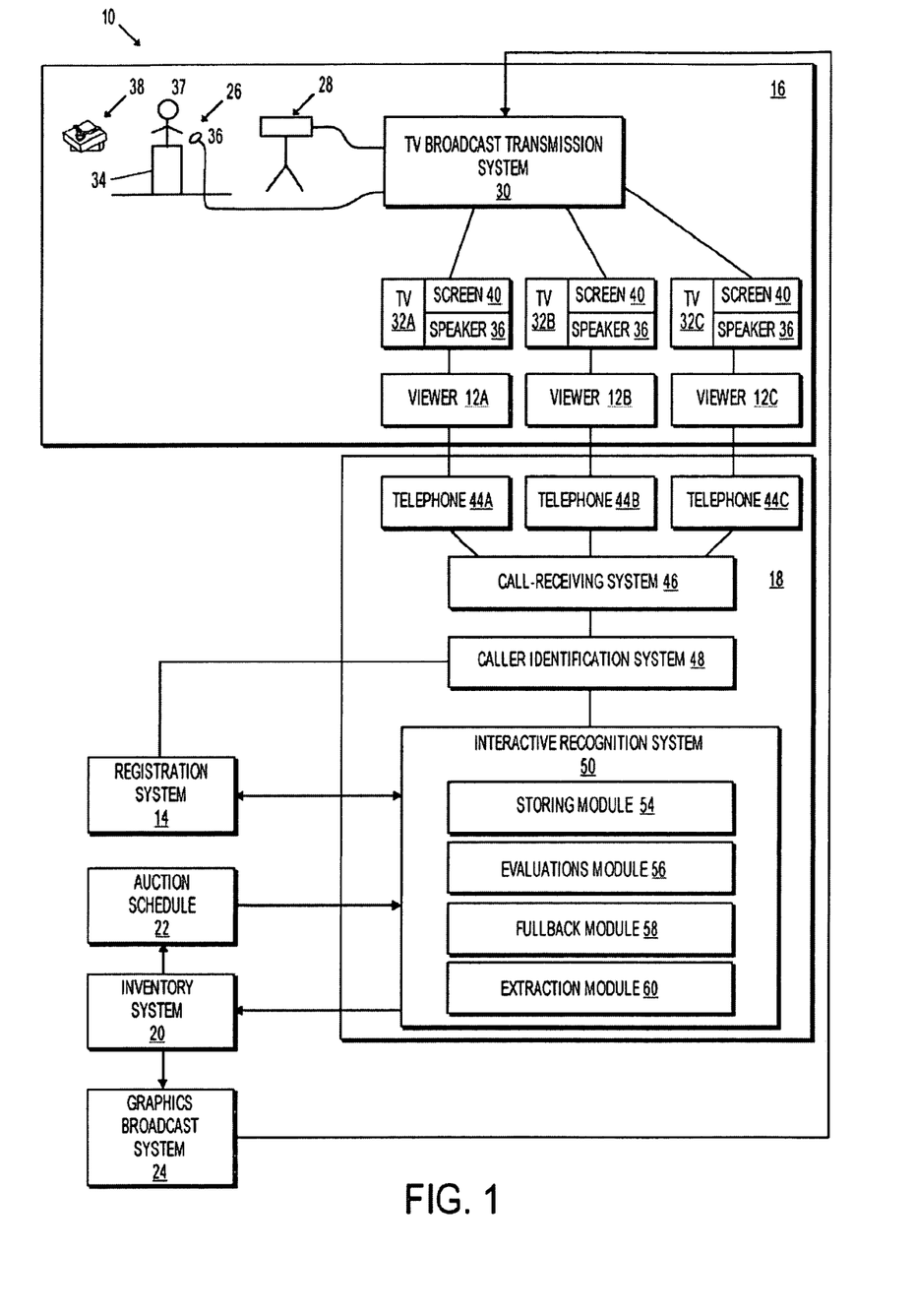
FIG. 1 is a block diagram of a system for interacting with a plurality of content receivers in the form of viewers, according to an embodiment of the invention.

FIG. 1 of the accompanying drawings illustrates a content distribution system 10, according to an embodiment of the invention, for interacting with a plurality of viewers 12A, 12B, and 12C.

The system 10 includes a registration system 14, a show recording and broadcasting system 16, a call management system 18, an inventory system 20, and auction schedule 22, and a graphics broadcasting system 24.

The show recording and broadcasting system 16 includes a studio set 26, a TV camera 28, a TV broadcast transmission system 30, and a plurality of TVs 32A, 32B, and 32C.

The studio set 26 has a podium area 34 and a microphone 36. A presenter 37 and an auction article 38 can be positioned on the podium area 34. The microphone 36 is sufficiently close to the presenter 37 to pick up speech from the presenter 37.

The TV camera 28 is located just outside the studio set 26. The TV camera 28 can capture a live picture, and is positionable to capture a scene that includes an image of the presenter 37 and the auction article 38 at the podium area 34.

The TV camera 28 and the microphone 36 are both connected to the TV broadcast transmission system 30. The TV broadcast transmission system 30 includes hardware and software that transmits a signal of images captured by the TV camera 28 and sound from the microphone 36 to the TVs 32A, 32B, and 32C. Signals may, for example, be transmitted over a cable network or over the airwaves. Although TV broadcasting is described, it is also envisioned that the invention may find application in other forms of signal transmission, for example over the Internet, to a plurality of computer systems. The invention may also manifest itself in media other than TV (to content receivers in the form of TV viewers), for example radio (to content receivers in the form of radio listeners).

Each TV 32A, 32B, and 32C has a screen 40 and a speaker 42. An image captured by the TV camera 28 is displayed in real time on the screens 40, and a sound signal picked up by the microphone 36 creates a sound in real time out of the speakers 42. The viewers 12A, 12B, and 12C in front of the TVs 32A, 32B, and 32C can see the presenter 37 and the auction article 38 on the screens 40, and hear the presenter 37 through the speakers 42 in real time.

The call management system 18 includes a plurality of telephones 44A, 44B, and 44C, a call-receiving system 46, a caller identification system 48, and an interactive recognition system 50.

Each one of the telephones 44A, 44B, and 44C is located in the home of a respective one of the viewers 12A, 12B, and 12C. The telephones 44A, 44B, and 44C are connected over at least one telephone network to the call-receiving system 46. The telephones 44A, 44B, and 44C may, for example, be conventional land-line telephones or cellular telephones, and may be connected through one or more land-line networks or one or more cellular networks to the call-receiving system 46.

The caller identification system 48 is connected to the call-receiving system 46. A caller identification system 48 can recognize a telephone number in a signal from a telephone from which it is receiving a call. Caller identification systems are known in the art, and are not described in detail herein.

The interactive recognition system 50 is connected to the caller identification system 48, the registration system 14, the inventory system 20, and the auction schedule 22. The interactive recognition system 50 is a computer that includes a processor, memory connected to the processor, and a software program that is stored in the memory and is executable by the processor. The software program that is stored in memory includes a storing module 54, an evaluation module 56, a fallback module 58, and an extraction module 60. The storing module 54 can interact with a caller and progress a caller through a menu, wherein the caller is allowed to enter a bid amount. The caller may use a dial pad on a telephone to interact with the interactive recognition system 50, and/or the interactive recognition system 50 may be programmed to recognize voice commands.

Figure 2:
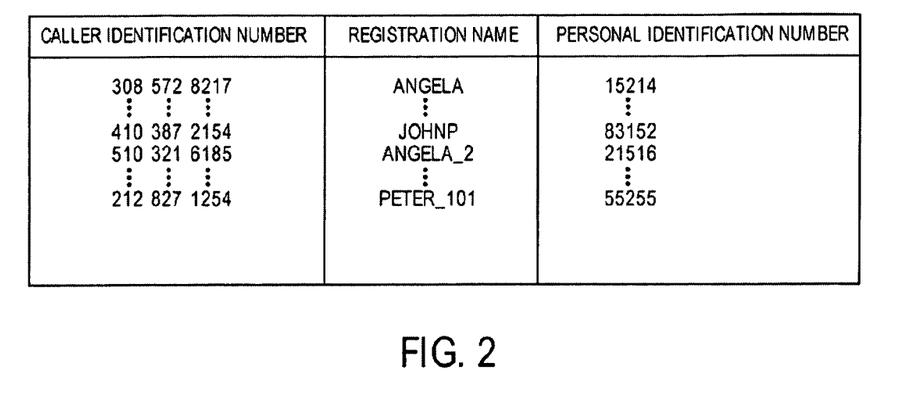
FIG. 2 is a table illustrating fields of a registration database forming part of the system of FIG. 1.

The registration system 14 includes a registration database such as illustrated in FIG. 2. The registration database includes fields for caller identification numbers, registered names, and personal identification numbers (PINs). The viewers 12A, 12B, and 12C in FIG. 1 can add to the registration database shown in FIG. 2, utilizing a separate interactive recognition system (not shown) or over the Internet.

The inventory system 20 includes a database of all products that are available for purposes of bidding on. The database typically includes fields for product description, quantity, and color. The auction schedule is simply a listing of a subset of the products in the inventory system 20.

The graphics broadcasting system 24 is connected via the inventory system 20 to the interactive recognition system 50. Text can be provided by the interactive recognition system 50 and the inventory system 20 to the graphics broadcast system 24. The graphics broadcast system 24 is connected to the TV broadcast transmission system 30. The text received by the graphics broadcast system 24 is provided to the TV broadcast transmission system 30. The TV broadcast transmission system 30 adds text on top of an image or scene that is being recorded by the camera 28, for purposes of viewing on the screens 40.

Figure 3:
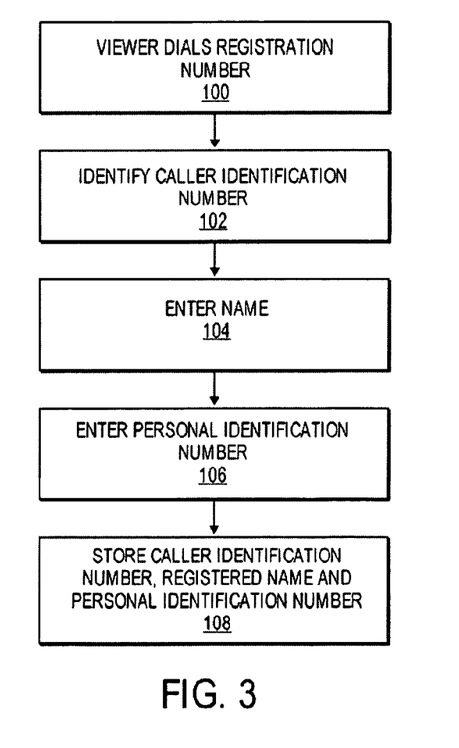
FIG. 3 is a flow chart illustrating how the database of FIG. 2 is created.

FIG. 3 illustrates how a viewer can pre-register by adding information to the database of the registration system 14 in FIG. 1. A registration number is provided, and a viewer dials the registration number (100). The call is connected to an interactive recognition system (not shown) that is dedicated for registration purposes and is different than the interactive recognition system 50. A caller identification system (not shown) identifies a caller identification number of a telephone from which the viewer is calling (102). The interactive recognition system then prompts the viewer to enter a registered name, and the viewer responds to the prompt by entering a name (104). The viewer enters the name on a dial pad of the telephone from which the viewer is calling.

The interactive recognition system subsequently prompts the viewer to enter a personal identification number, and the viewer responds by entering a personal identification number on the dial pad of the telephone from which the viewer is calling (106). The interactive recognition system then stores the identification number, registered name, and personal identification number in the database of the registration system 14 (108). A viewer may alternatively enter information into the database of the registration system 14 over the Internet, or information can be manually entered by a service person after receiving a telephone call from the viewer, or from a mail entry.

Figure 4:
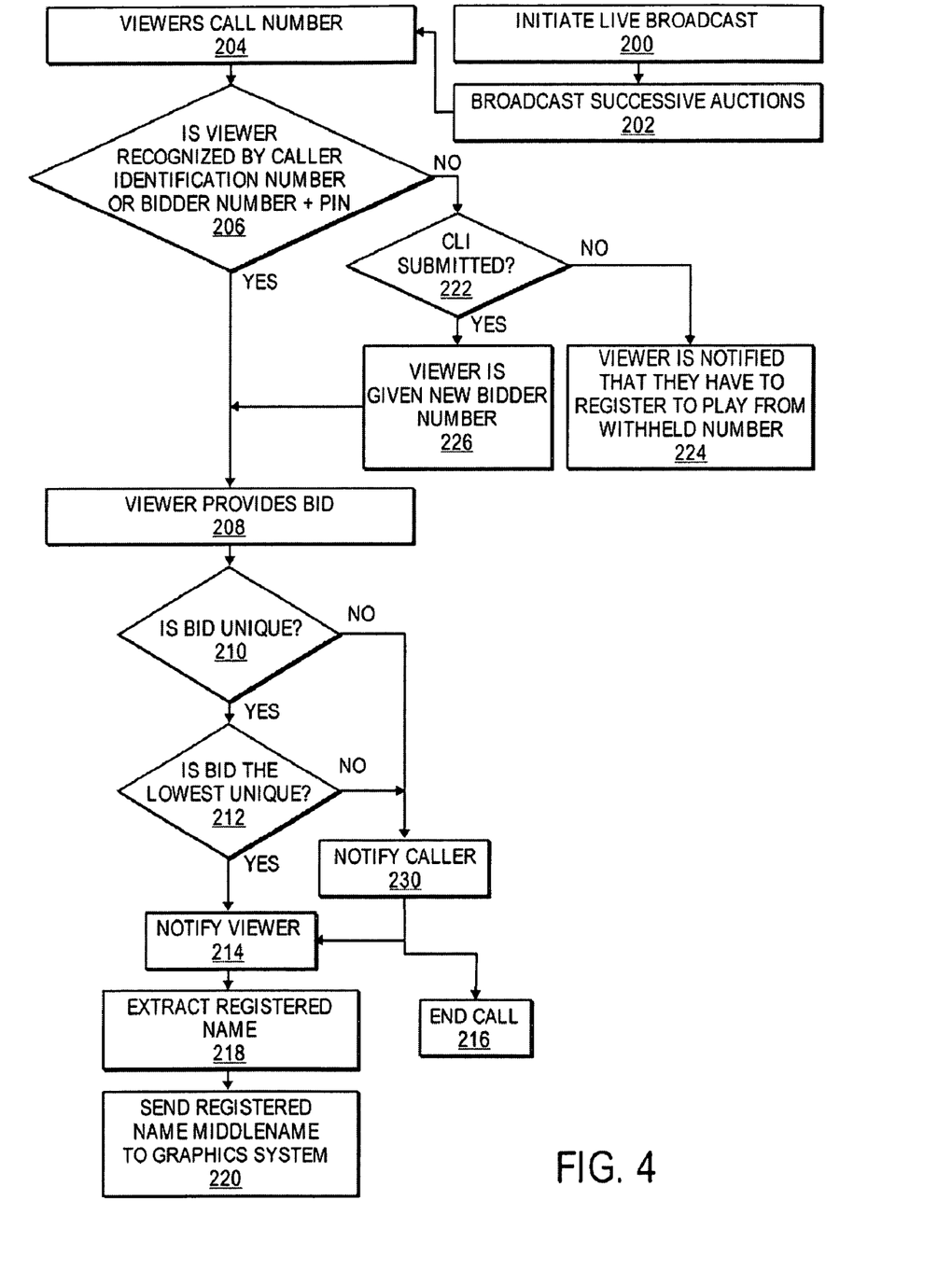
FIG. 4 is a flow chart illustrating how the system of FIG. 1 operates.

Reference is now made to FIGS. 1 and 4 in combination. In use, recording and live broadcasting is initiated (200). The camera 28 is positioned so as to capture a scene that includes the presenter 37 or the auction article 38 at the podium area 34, and speech from the presenter 37 is picked up and converted to a voice signal by the microphone 36. Image and voice signals are transmitted by the TV broadcast transmission system 30 to the TVs 32A, 32B, and 32C, and the viewers 12A, 12B, and 12C view the presenter 37 or the auction article 38 on the screens 40, and can hear the presenter 37 through the speakers 42 in real time.

Figure 5:
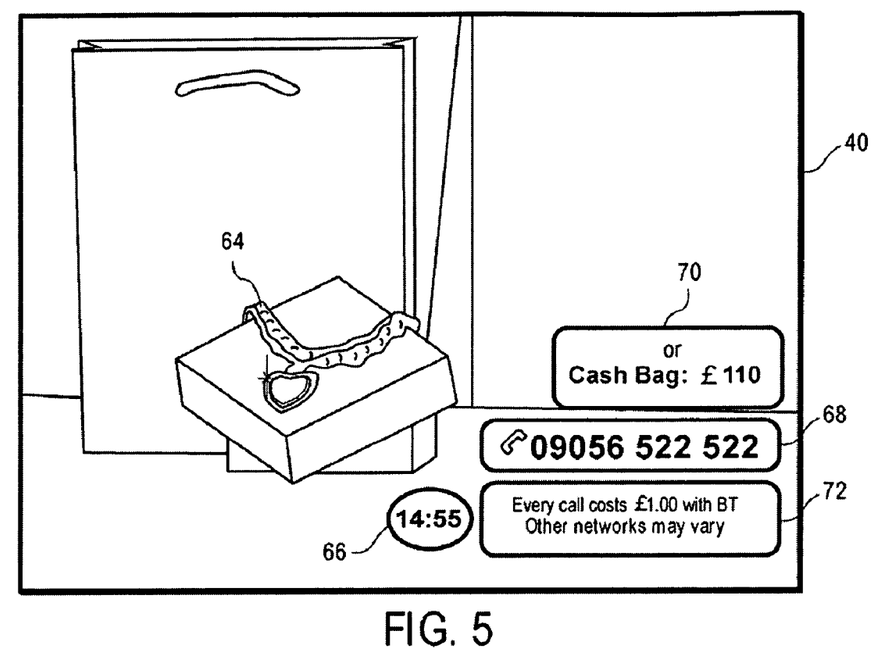
FIG. 5 is a front view of a TV screen that has an image of an auction article and text boxes showing information relating to an auction for the auction article or its cash equivalent.

Successive auctions are then broadcast (202). The camera 28 is first positioned to capture an image that includes the presenter 37. The presenter 37 then explains the rules of the game to the viewer 12A. The camera 28 is then positioned to capture a scene that includes a picture of the auction article 38, and the presenter 37 verbally announces the opening of the auction. FIG. 5 illustrates one of the screens 40 after the auction is initiated. A scene on the screen 40 includes an image 64 of the auction article 38. The graphics broadcasting system 24 also displays the four text boxes 66, 68, 70, and 72 over the scene captured by the camera 28, but not over the image 64 of the auction article 38. The text box 66 shows the time remaining for the auction. In the present example, the auction lasts for 15 minutes, and five seconds have elapsed, so that the total remaining time is 14 minutes and 55 seconds. The text box 68 shows the call-in number that a viewer has to call to venture a bid on the auction. The text box 70 illustrates a cash alternative amount. A winning bidder can opt to receive either the auction article 38 or a facsimile thereof, or a cash amount, in the present example, £110. The text box 72 provides information regarding the cost for venturing a bid.

One or more of the viewers 12A, 12B, or 12C may then call the number provided in the text box 68 (204). The viewers 12A, 12B, or 12C utilize the telephones 44A, 44B, or 44C to call the call-receiving system 46. A network operator is responsible for connecting the call between, for example, the telephone 44A and the call-receiving system 46, charges the viewer 12A for connecting the call, and the charge is displayed on a monthly statement that is sent to the viewer 12A. The number provided in the text box 68 has been selected by an operator of the system 10 to be a 0900 number, which means that a portion of the amount that the network operator charges the viewer 12A will be transferred to the operator of the system 10. The charging and transfer of money is automatically done by computers utilizing conventional networks, details of which are known in the art and are not described in detail herein.

Next, the caller identification system 48 determines, whether the viewer 12A utilizing the telephone 44A is recognized by either a caller identification number of the telephone 44A or a bidder number, and the viewer is asked to enter a PIN (206). The caller identification system 48 first determines whether a caller identification number can be extracted from a signal that the call-receiving system 46 receives from the telephone 44A. If a caller identification number is extracted, the caller identification system 48 compares the extracted caller identification number with the caller identification numbers in the database illustrated in FIG. 2. In the present example, the caller identification system 48 determines that the caller identification number extracted from the signal from the telephone 44A is 510-321-6185, which is listed in the database of FIG. 2, against the name of "ANGELA_2" with a personal identification number of 21516. The caller identification system 48 then prompts the viewer 12A to enter a personal identification number on the dial pad of the telephone 44A. In the present example, the viewer 12A enters the personal identification number 21516, which is the same as the personal identification number identified in the database of FIG. 2. Because of a favorable comparison between the personal identification numbers entered by the viewer 12A and identified in the database of FIG. 2, the viewer 12A is allowed to proceed with the auction, i.e., the viewer is recognized.

Figure 6:
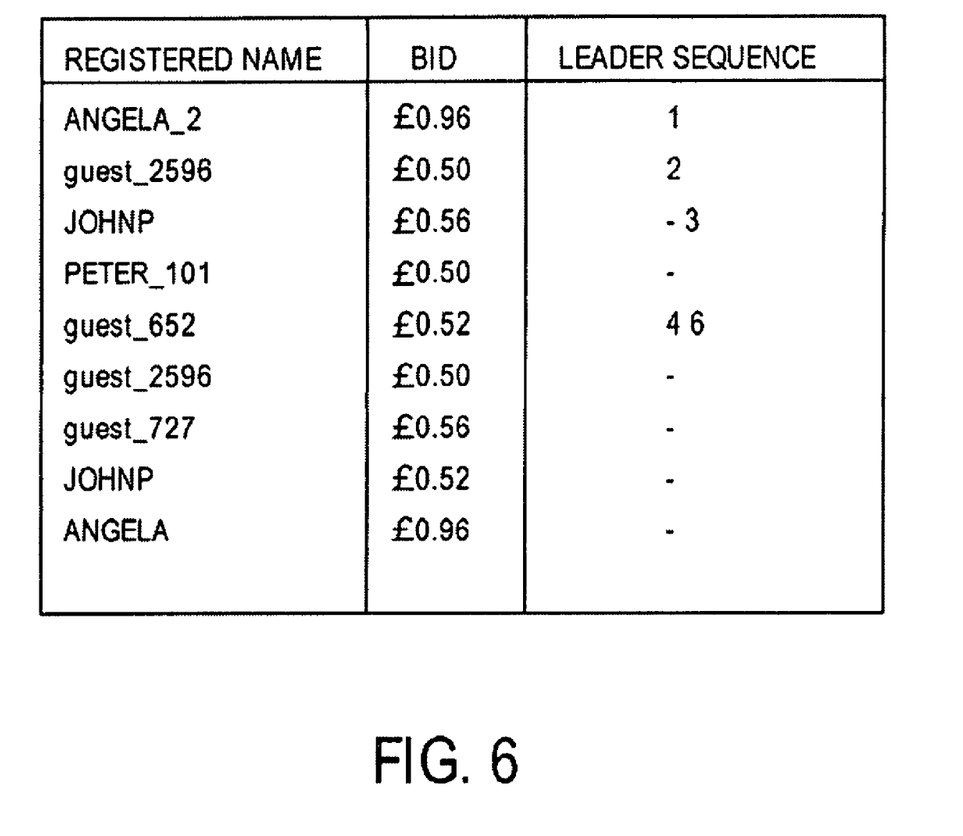
FIG. 6 is a table illustrating the progression of an auction according to the process illustrated in FIG. 4.

The call of the viewer 12A is then forwarded to the interactive recognition system 50, and the viewer 12A provides a bid (208). The interactive recognition system 50 prompts the viewer to enter a bid, and the viewer 12A enters the bid utilizing the dial pad of the telephone 44A. In the present example, the viewer 12A enters 096#. The interactive recognition system 50 recognizes the bid as £0.96. The storing module 54 stores the amount bid by the viewer 12A in a list or a database as illustrated in FIG. 6. The evaluation module 56 subsequently determines whether the bid of £0.96 is unique (210). The amount of £0.96 is the only bid submitted thus far, and is therefore unique. Next, the evaluation module 56 determines whether the bid of £0.96 is the lowest unique bid (212). The amount of £0.96 the only bid submitted thus far, and is therefore the lowest unique bid. The viewer 12A is notified that the bid submitted is the lowest unique bid (214), and the call is ended (216).

Figure 7:
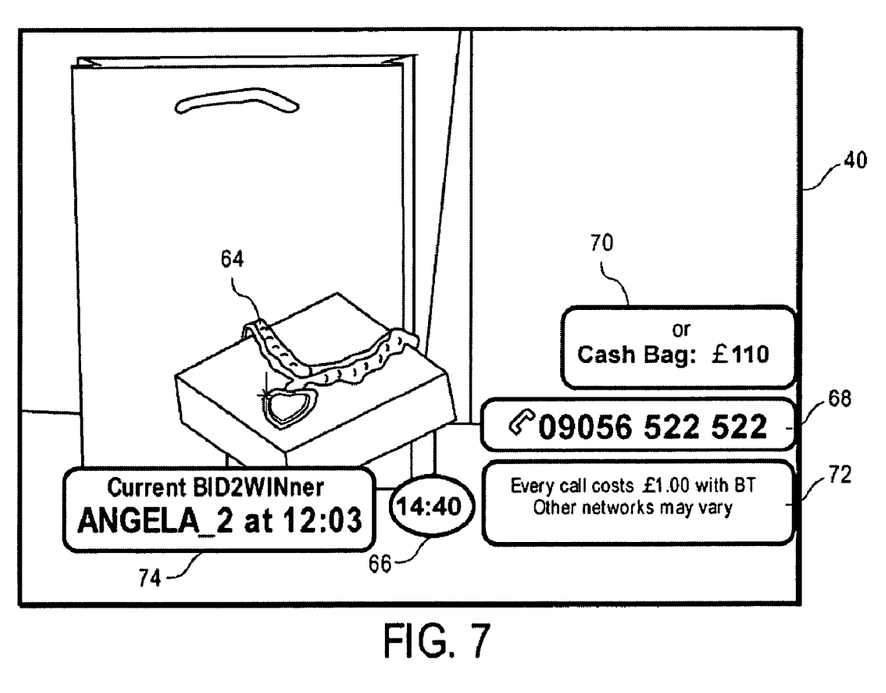
FIG. 7 is a view similar to FIG. 5, wherein a text box is added showing a present leader having submitted a lowest unique bid.

Next, the extraction module 60 extracts the registered name of the viewer 12A, in the present example of "ANGELA_2" (218). The extraction module 60 then sends the registered name to the graphics broadcasting system 24 (220). As illustrated in FIG. 7, the graphics broadcasting system 24 adds a text box 74 that includes the name of the viewer 12A that submitted the lowest unique bid, namely "ANGELA_2," and the time that the bid was submitted, namely at 12:03.

Figure 8:
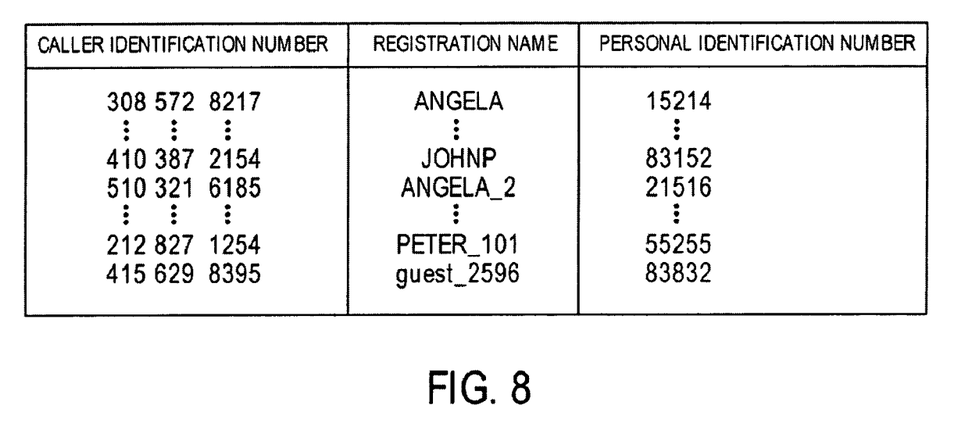
FIG. 8 shows the table of FIG. 2 after an entry is added.

Another viewer, for example the viewer 12B, may then call the number provided in the text box 68 (204). A determination is made whether the viewer 12B is recognized, either because of the caller identification number of the telephone 44B, or by entering a bidder number, in either case entering a personal identification number (206). Should no caller identification number be identifiable on a signal from the telephone 44B, or if the caller identification number cannot be found in the database of FIG. 2, the viewer 12B is prompted to enter a bidder number. In the present example, it is assumed that the viewer cannot be recognized by either a caller identification number or a bidder number. A determination is then made whether a caller identification number is submitted (222). If a caller identification number is not submitted, the viewer is notified that they have to register to play from a withheld number (224). If a caller identification number is submitted and identifiable, the viewer is given a new bidder number. In the present example, the new bidder number is 2596. The viewer is also prompted to enter a personal identification number. As illustrated in FIG. 8, a new entry is added to the database of FIG. 2 with a registered name, "guest_2596," a caller identification number for the telephone 44B, and the personal identification number 83832 entered by the viewer 12B.

Figure 9:
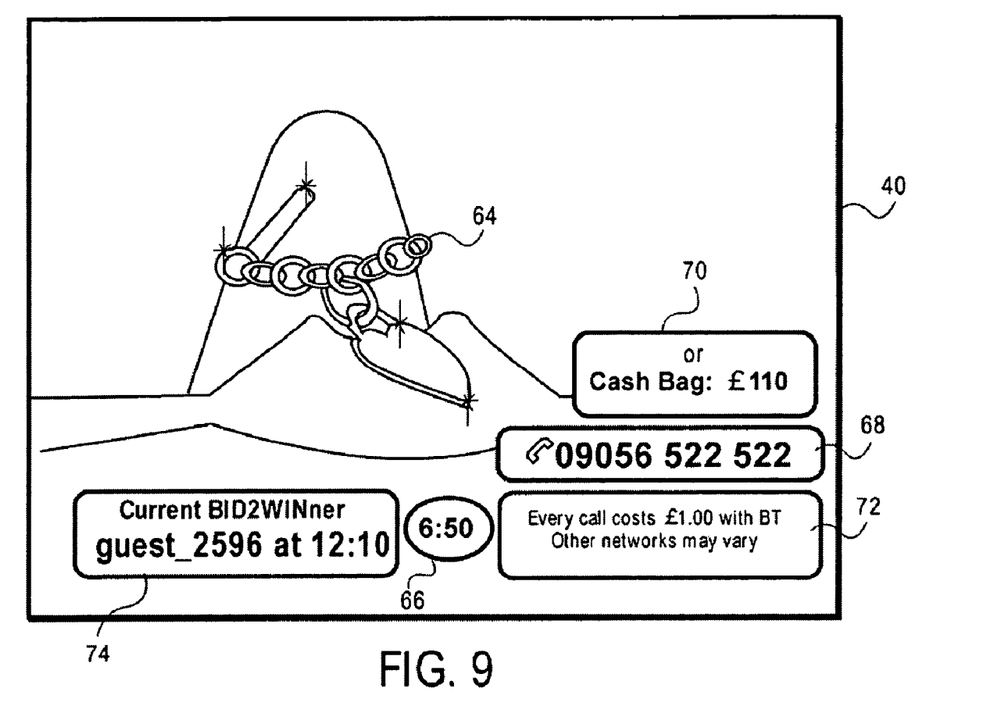
FIG. 9 is a view similar to FIG. 7, wherein the text box illustrating the present leader of the bid is updated.

Referring again to FIG. 6, the viewer 12B with the registered name "guest_2596" then enters a bid, in the present example, £0.50 (208). A determination is made whether the bid of £0.50 is unique (210). Since there are no other bids for an amount of £0.50, the bid submitted by "guest_2596" is unique. A determination is then made whether the bid of £0.50 is the lowest unique bid (212). A comparison is made between all the bids that are unique, namely the bids submitted by "guest_2596" and the bid submitted by "ANGELA_2," and it is found that the bid of £0.50 submitted by "guest_2596" is the lowest unique bid. As illustrated in FIG. 9, the graphics broadcasting system 24 of FIG. 1 then updates the text field box 74 to indicate the registered name of the present leader of the auction as "guest_2596," and the time of submission of the bid. The graphics broadcasting system 24 also updates the text box 66 every second to indicate the time remaining before closing of the auction.

Referring again to FIG. 6, a viewer with a registered name "JOHNP" submits a bid of £0.56. The bid of £0.50 submitted by "guest_2596" is, however, a lower bid than the bid of £0.56 submitted by "JOHNP." Referring to FIG. 4, the viewer corresponding to "JOHNP" is notified that the bid of £0.56 is not the lowest unique bid (230), and the call is ended (216).

Referring again to FIG. 6, a viewer with the registered name "PETER_101" subsequently submits a bid of £0.50. The bid of £0.50 submitted by "PETER_101" is, however, not unique, because it is identical to the bid of £0.50 submitted by "guest_2596." "PETER_101" is notified that the bid is not unique (230), and the call is ended (216). Moreover, the bid of £0.50 submitted by "guest_2596" is not unique, because it is identical to the bid of £0.50 submitted by "PETER_101," so that "guest_2596" is not the leader in the auction anymore. A recalculation is made to determine the lowest unique bid, which is the bid of £0.56 submitted by "JOHNP." "JOHNP" is thus the present leader of the auction.

"guest_652" subsequently submits a bid of £0.52, and is now the leader of the auction. "guest_2596" then submits a bid of £0.50, which is not unique. "guest_727" subsequently submits a bid of £0.56, which is not unique. "JOHNP" then submits a bid of £0.52, which is the same as the bid submitted by "guest_652." The lowest unique bid is not "ANGELA_2" with a bid of £0.96. "ANGELA" then submits a bid of £0.96, which is the same as the bid submitted by "ANGELA_2." Neither "ANGELA" nor "ANGELA_2" now has the lowest unique bid. Moreover, there is no longer a unique bid. A lowest unique bid can thus not be resolved with the process flow illustrated in FIG. 4.

Figure 10:
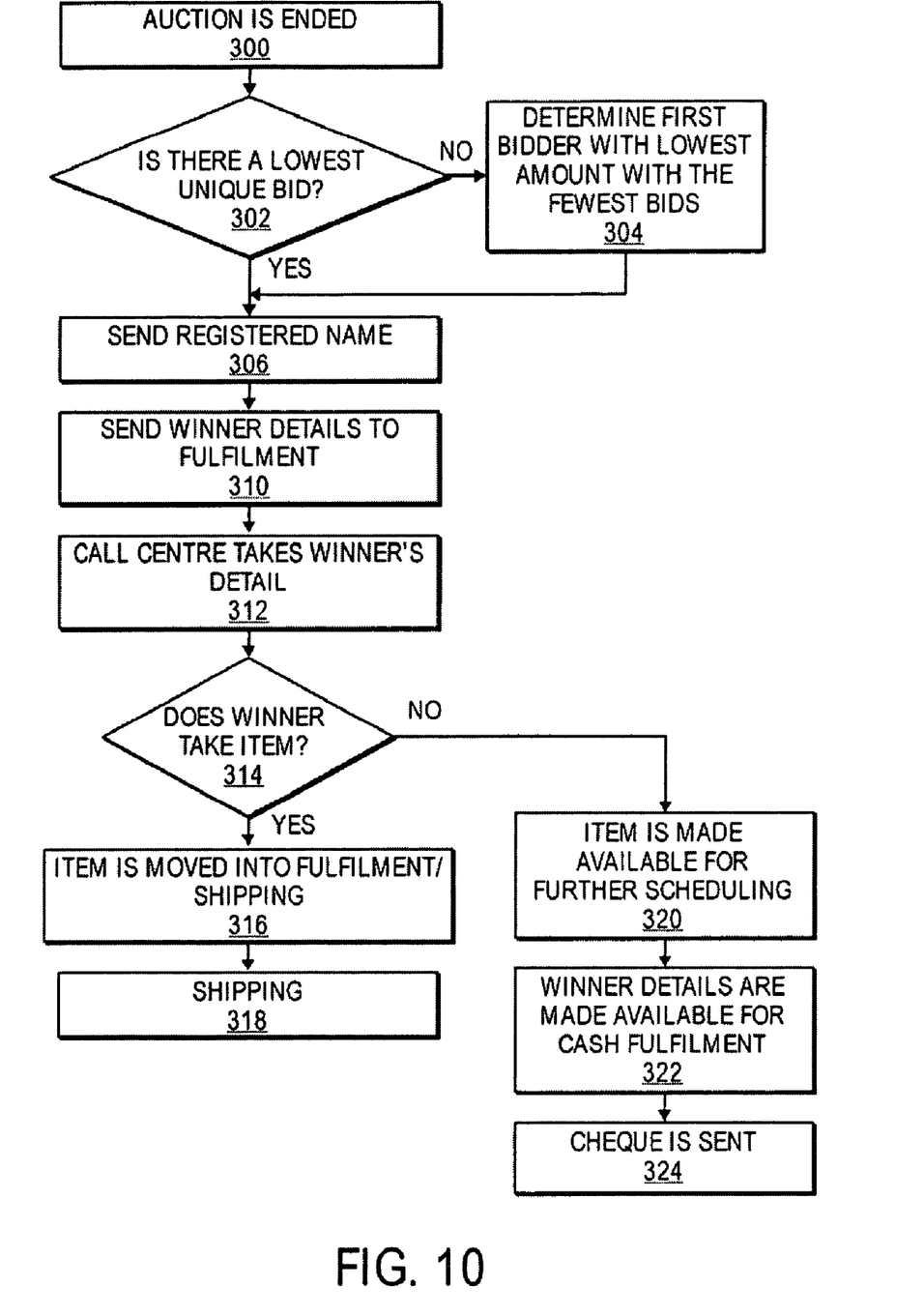
FIG. 10 is a flow chart illustrating functioning of the system of FIG. 1 after the auction is closed, and specifically illustrating how a winner is determined if there is no unique bid.

FIG. 10 illustrates how the winner of the auction is resolved, also determining the winner of the auction if there is no unique bid. First, the auction is ended when the text box 66 in FIG. 9 shows zero seconds (300). The process steps 210 and 212 of FIG. 4 are then executed to determine the lowest unique bid. In the present example, there is no lowest unique bid. The fallback module 58 in FIG. 1 then determines the first bidder with the lowest amount with the fewest bids (304). It is first determined how many bids are submitted for each amount. In the present example, three bids are submitted for the amount of £0.50, two bids for £0.52, two bids for £0.56, and two bids for £0.96. The amounts of £0.52, £0.56, and £0.96 thus have the fewest number of bids, namely two each. The amount of £0.50 does not qualify, because more than two bids have been submitted for that amount. Next, a determination is made as to which one of the amounts that have two bids each is the lowest, i.e., which is the lowest of £0.52, £0.56, and £0.96. The lowest amount with the fewest bids is thus £0.52. Next, a determination is made as to who submitted the first bid with the lowest amount with the fewest bids, i.e., who submitted the first bid for £0.52. In the present example, "guest_652" submitted the first bid for £0.52, and is thus the winner of the auction.

In another example, there may be a lowest unique bid, and the viewer who submitted the lowest unique bid is the winner of the auction.

Figure 11:
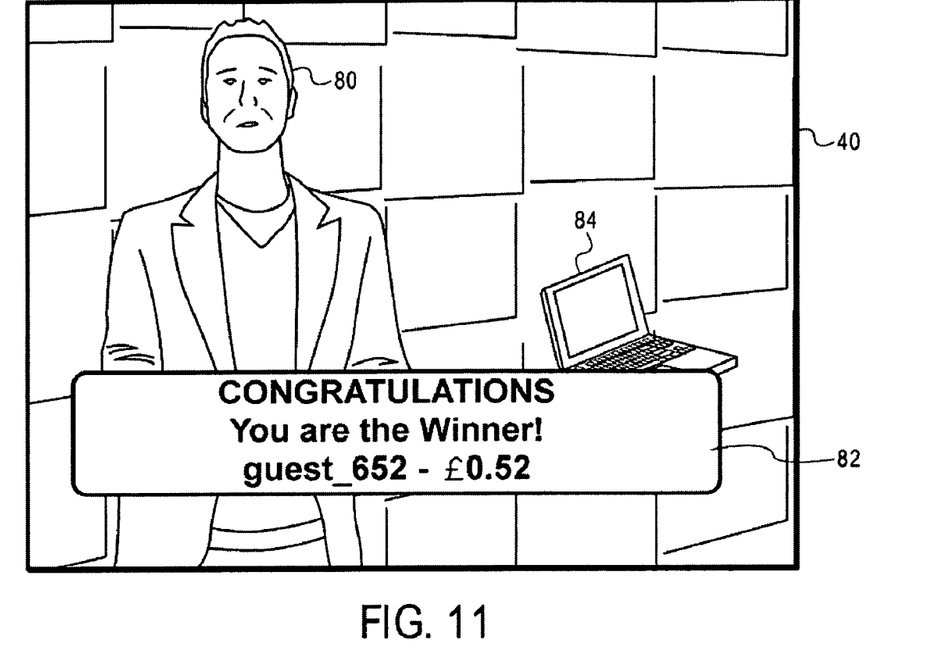
FIG. 11 is a front view of the screen of FIG. 9 when a winner is announced.

Next, the registered name of the winner of the auction is sent by the graphics broadcasting system 24 in FIG. 1 to the TV broadcast transmission system 30 (306). FIG. 11 illustrates one of the screens 40 after the winner has been determined. The camera 28 is directed to the presenter 37, and an image 80 of the presenter 37 appears on the screen 40. The text boxes 66, 68, 70, 72, and 74 in FIG. 9 are removed by the graphics broadcasting system 24, and a text box 82 is added. The text box 82 includes the registered name of the winner, and the amount that has been bid, namely "guest_652" at an amount of £0.52. The presenter 37 also announces the details presented in the text box 82.

Figure 12:
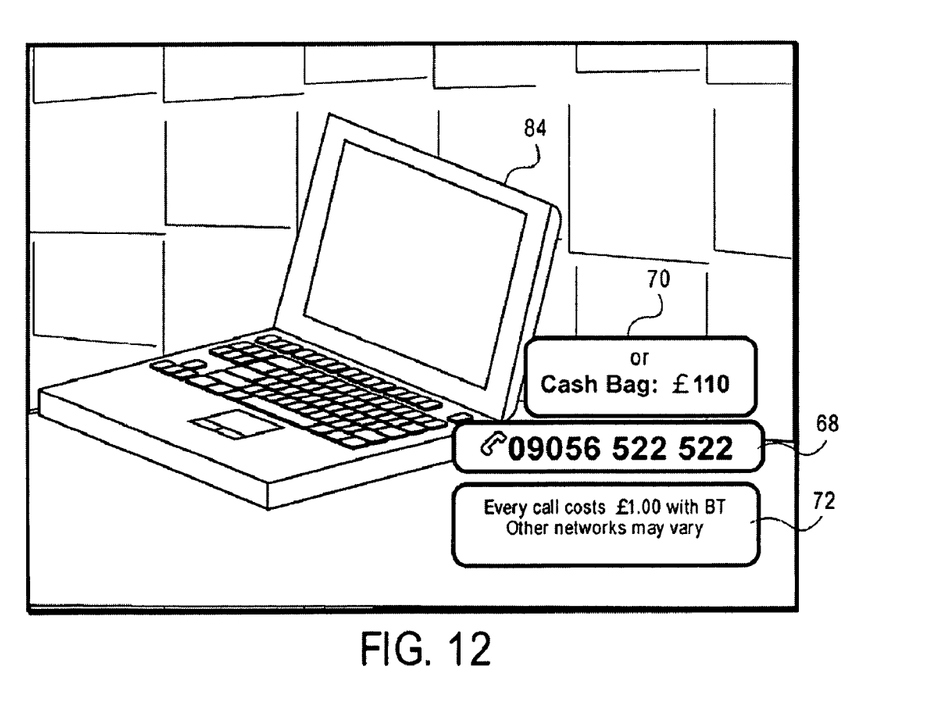
FIG. 12 is a front view of the screen of FIG. 11 showing an image of a new auction item and having text boxes similar to the text boxes of FIG. 5.

Referring again to FIG. 4, a subsequent auction is subsequently broadcast (202), and the steps hereinbefore described are repeated with another auction article. As illustrated in FIG. 12, an image 84 of a new auction article is displayed on the screen 40. The screen 40 illustrated in FIG. 12 is the same as the screen 40 illustrated in FIG. 5 in all other respects.

Referring again to FIG. 10, winner details are sent to fulfillment (310), and a person at a call center takes the winner's details over the phone (312). The person at the call center then gives the winner an option to take either the auction article 38 in FIG. 1 or a facsimile thereof, or to take the cash alternative (314). If the winner decides to take the auction item 38, the item is moved into fulfillment/shipping, and the inventory system 20 in FIG. 1 is updated (316). The auction article or a facsimile thereof is then shipped to the winner (318). By contrast, if the winner decides to take the cash amount, the auction item 38 is made available for further scheduling on the auction schedule 22 (320), and the inventory system 20 is not updated. Details of the winner are then made available for cash fulfillment (322), and a check is sent for the cash alternative amount, in the present example, £110 (324).

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A system for interacting with a plurality of content receivers, comprising:
   a transmission system for transmitting information about an auction article to a plurality of remote locations to be received by a plurality of content receivers at the respective remote locations, and transmitting an invitation to enter a lowest unique bid for the auction article to the content receivers at the respective remote locations;
   a receiving system to receive a plurality of bid amounts for the auction article from a subset of the plurality of content receivers;
   a computer memory;
   a computer processor;
   a storing module in the computer memory, which is executable by the processor to store the bid amounts and information of the subset of the plurality of content receivers who submitted the bid amounts in the computer memory;
   an evaluation module in the computer memory, which is executable by the computer processor to determine a lowest unique bid among the bid amounts stored in the computer memory;
   an extraction module in the computer memory, which is executable by the processor to extract information of a winning content receiver who submitted the lowest unique bid from the memory and
   a fallback module in the computer memory, that executes in the computer processor if the evaluation module determines that there is no unique bid, the fallback module:
   (i) determining which bid amounts have the lowest number of bids;
   (ii) determining which bid amount determined in (i) is the lowest; and (iii) determining which bid determined in (ii) was first submitted, the extraction module extracting information of a winning content receiver who submitted the bid determined in (iii).

2. The system of claim 1, wherein the information about the auction article includes an image signal of the auction article so that an image of the auction article is viewable on screens at the respective remote locations.

3. The system of claim 2, further comprising a camera system positionable to record a live image of the auction article and convert the live image to the image signal that is transmitted by the transmission system.

4. The system according to claim 1, wherein the receiving system is a telephone receiving system.

5. The system of claim 4, wherein the telephone receiving system, computer processor, storing module, evaluation module, and extracting module form part of an interactive voice recognition system.

6. The system according to claim 1, wherein the telephone receiving system receives a bid amount when a content receiver enters the bid amount on a key pad of a telephone.

7. The system according to claim 1, wherein the evaluation module:
   (i) determines whether a bid is unique; and
   (ii) determines whether the bid is the lowest bid after determining whether the bid is unique.

8. The system according to claim 1, further comprising a bid termination system for ending an auction.

9. The system of claim 8, wherein the evaluation module determines a lowest unique bid after the auction is ended.

10. The system of claim 9, wherein the evaluation module determines a lowest unique bid before the auction is ended.

11. The system of claim 8, further comprising a graphics broadcasting system that provides text identifying the bidder with the lowest unique bid to the transmission system, the transmission system transmitting a signal of the text to be viewed on screens at the remote locations.

12. A method of interacting with a plurality of content receivers, comprising:
   1) transmitting information about an auction article to a plurality of remote locations to be received by the content receivers located at the respective remote locations;
   2) transmitting an invitation to enter a lowest unique bid for the auction article to the content receivers at the respective remote locations;
   3) receiving a plurality of bid amounts for the auction article from a subset of the plurality of the content receivers;
   4) storing the bid amounts and information of the subset of the plurality of content receivers who submitted the bid amounts in memory of a computer;
   5) executing an evaluation computer module in a processor of a computer that determines a lowest unique bid among the bid amounts stored in the memory;
   6) extracting the information of a winning content receiver who submitted the lowest unique bid from the memory; and
   (7) if the evaluation module determines that there is no unique bid:
      (i) determining which bid amounts have the lowest number of bids;
      (ii) determining which bid amount determined in (i) is the lowest; and
      (iii) determining which bid determined in (ii) was first submitted, the extracting module extracting information of a winning content receiver who submitted the bid determined in (iii)
   (8) notifying the winning content receiver of submitting the lowest unique bid.

* * * * *